United States Patent [19]

Cheeseboro

[11] 4,222,574

[45] Sep. 16, 1980

[54] RADIAL-TRACKING PROGRAMMABLE RECORD PLAYER

[76] Inventor: Robert G. Cheeseboro, 3650 Somerset Dr., Los Angeles, Calif. 90016

[21] Appl. No.: 951,563

[22] Filed: Oct. 16, 1978

Related U.S. Application Data

[62] Division of Ser. No. 778,027, Mar. 16, 1977, Pat. No. 4,121,836.

[51] Int. Cl.³ .............................................. G11B 17/06
[52] U.S. Cl. ................................ 274/13 R; 274/23 A
[58] Field of Search .................. 274/9 RA, 9 B, 13 R, 274/14, 15 R, 23 A

[56] References Cited

U.S. PATENT DOCUMENTS

| | | | |
|---|---|---|---|
| 2,293,217 | 8/1942 | Rieber | 274/13 R |
| 2,566,091 | 8/1951 | Masterson | 274/13 R |
| 2,915,315 | 12/1959 | Rabinow | 274/13 R |
| 3,381,967 | 5/1968 | Miner et al. | 274/13 R |
| 4,061,342 | 12/1977 | Young | 274/23 A |
| 4,093,832 | 6/1978 | Isaacson et al. | 274/15 R |
| 4,118,039 | 10/1978 | Kuratal et al. | 274/23 A |
| 4,135,086 | 1/1979 | Baba | 274/23 A |

OTHER PUBLICATIONS

Makara Model 4824 Technical Report vol. 1.
Diatone Vertical Audio System X-1000.

Primary Examiner—John W. Shepperd
Attorney, Agent, or Firm—Christie, Parker & Hale

[57] ABSTRACT

In a record player, a phonograph record disc is supported in a playing position on a turntable which is rotatably drivable at a selected speed about an axis. The disc, in its playing position, is engageable with a stylus carried by a transducer cartridge which is held in a carriage. The carriage is movable in a guide which defines a line of carriage movement radially of the turntable, the carriage being so movable in response to engagement of the stylus in the record groove. The player includes sensing means comprised of a follower member which is disposed adjacent the carriage and which is drivable along a path parallel to the carriage line for following the movement of the carriage during play of a record. The sensing means is operable for sensing the relative positions along the line and the path of the carriage and of the follower member, and for generating a signal indicative of such relative positions. The follower is driven, in a manner tending to drive the signal to zero, by a stepping motor, the drive pulses of which are counted to derive an indication of the position of the carriage at any time, or for use in driving the carriage via the follower to a predetermined position radially of the turntable. The follower is also a component of a lift mechanism which lifts the cartridge in the carriage, moving the stylus away from a record for traversal of the carriage radially of a record.

28 Claims, 11 Drawing Figures

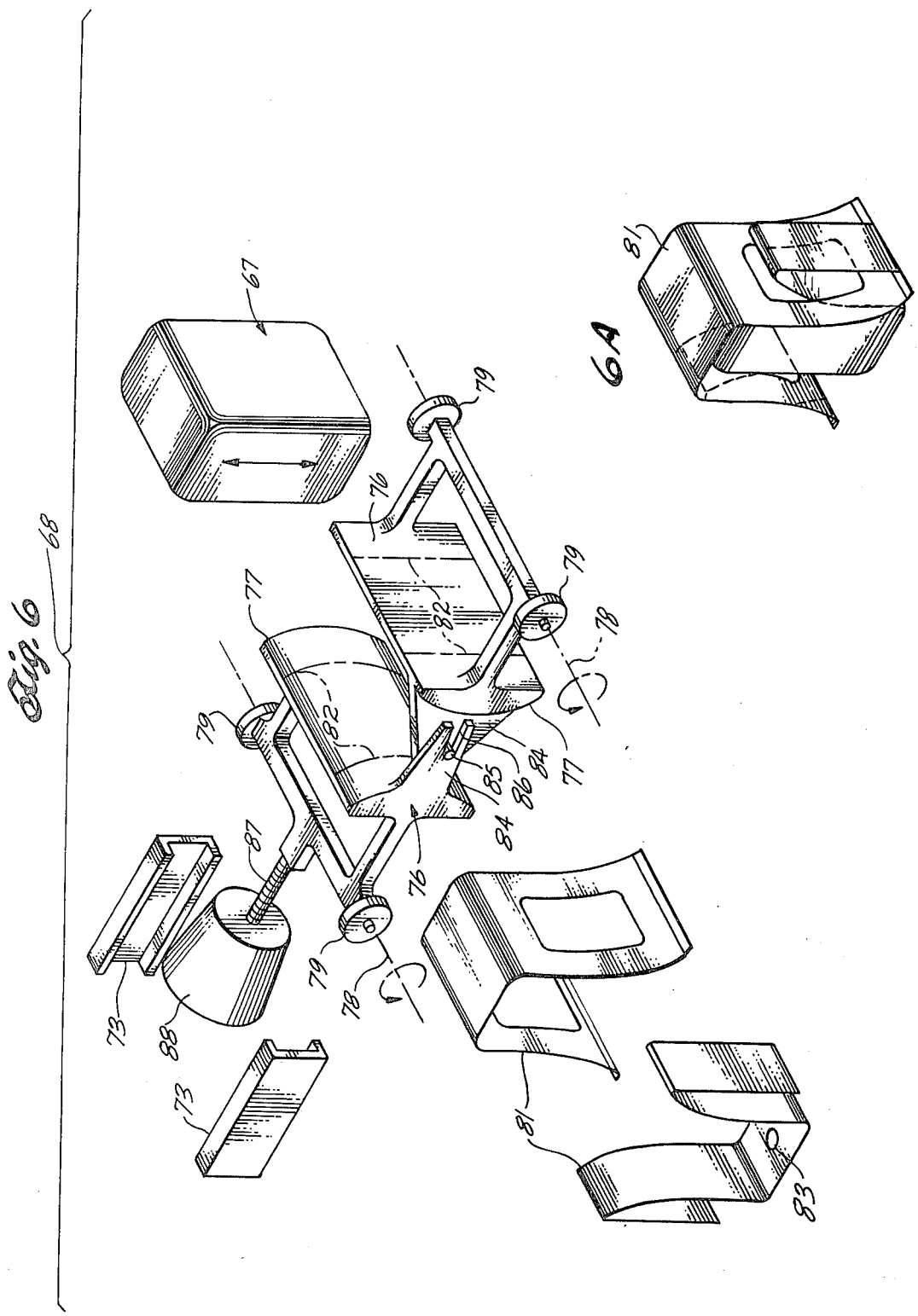

RADIAL-TRACKING PROGRAMMABLE RECORD PLAYER

CROSS REFERENCE TO RELATED APPLICATIONS

This is a division of application Ser. No. 778,027, filed Mar. 16, 1977 now U.S. Pat. No. 4,121,836.

BACKGROUND OF THE INVENTION

1. Field of the Invention

This invention relates to record players, i.e., to equipment useful with a phonograph record disc to sense by a stylus, and to convert by a transducer to an electrical signal, audio information contained in the contours of the spiral groove defined in the disc. More particularly, it relates to a programmable record player in which the stylus moves across a record disc along a line radially of the disc axis of rotation and in which the transducer cartridge, to which the stylus is mounted, is carried in a novel suspension which enables substantially zero tracking force to be achieved between the stylus and the record disc and which, apart from the overall radial-tracking movement, constrains the cartridge to move without change in the tracking force only perpendicular to the disc's plane of rotation under loads imposed on the stylus by the record.

2. Review of the Prior Art

My prior U.S. Pat. No. 3,658,347 describes a record player in which a phonograph record disc, during playing of the record when a stylus is engaged in the record's spiral groove, is held captive between a driven record supporting turntable below the record and a clamp disc above the record. The stylus is carried by a transducer cartridge which is mounted in a carriage located above the record. The carriage is supported on rollers engaged in rails so disposed that the path of movement of the stylus, overall across the record, is along a line parallel to and radially of the record.

The advantages of radial-tracking record players, as compared to record players in which the stylus and the cartridge are mounted on the end of a long pivoted tone arm, is that the stylus path of movement across the record corresponds to the path of movement traversed by the cutting head of the lathe used to define the master record of which the usual commercially available record is a replica. Thus, in theory, a radial-tracking record player better reproduces the sounds defined in the contours of the walls of the spiral groove of the record.

Virtually all phonograph records now produced, regardless of size, are manufactured to reproduce stereophonic sound. In the cutting of the masters from which the records are reproduced, the cutting tool of the master cutting lathe moves in the cutting head only normal to the master disc (to produce variations in groove depth) and from side-to-side radially of the master disc (to produce local variations in the contour of the groove sidewalls defining the actual audio information); the overall spiral pattern of the groove is generated in the master disc by controlled movement of the lathe cutting head radially of the master disc's axis of rotation.

Thus, to optimally reproduce the sounds recorded in a phonograph record, a record player should limit the motions of the pickup stylus to only those motions which are experienced by the cutting tool used to cut the master disc. Also, the stylus should be mounted in the record player so that it can accommodate these limited motions without any variation in the force with which the stylus engages the record groove. The present record player accomplishes this optimum result significantly better than is the case of record players according to my prior patent, and also better than is the case in other radial-tracking record players now commercially available.

Radial-tracking record players are now commercially available and are marketed in the United States and elsewhere under the tradenames Bank & Olufsen and Rabco, among others. All of these record players mount the stylus and cartridge on the end of an elongate tone arm which is hinged at its other end for rotation of the arm at least in a plane perpendicular to the plane of rotation of a record engaged by the stylus. This is done to enable the stylus and cartridge to move vertically to follow warpage which is common in mass-produced phonograph records. Such hinging of the tone arm enables the stylus to have a freedom of motion not permitted to the cutting tool in the manufacture of the master disc; to at least this extent, these other radial-tracking record players depart from the optimum tracking characteristics described above. The present record player does not afford this additional mode of motion to the stylus and cartridge. The other radial-tracking record players mentioned above suffer from additional disadvantages which are overcome in the present record player.

SUMMARY OF THE INVENTION

This invention provides a radial-tracking record player in which the stylus better conforms to the optimum tracking characteristics described above. The instantaneous motions of the stylus during playing of a record are limited to side-to-side motions in the record groove and to only linear motion of the stylus and its supporting transducer cartridge along a line perpendicular to the record plane of rotation. The stylus is enabled to conform to warpage of a record with greatly reduced variation, if any, in the force with which the stylus engages the record. These advantages are produced by a novel cartridge suspension mechanism in the present record player.

These advantages preferably are embodied in a record player which includes many of the advantages and features of the record player described in my prior U.S. Pat. No. 3,658,347. Thus, the preferred embodiment of the present record player requires only that the user place a record on receiving supports and actuate a control button to command the player to PLAY the record; thereafter, the record is handled automatically by the player and brought into engagement with the stylus. During playing of the record, it is fully enclosed in the record player and is protected from damage.

Also, the preferred embodiment of the present record player includes a programmable control arrangement which gives a user heretofore unavailable operating choices and control over which passages on a record will be played in any sequence desired. That is, the record player enables a user to select the precise beginning and end points of a recorded passage of interest, to repeat the playing of the passage any number of times desired, and to play desired passages in any sequence desired, even a sequence different from the sequence defined in the phonograph record. Commands for such operations may be entered into the record player manually by the user at the time of playing a particular record, or the necessary commands may be recorded on the record itself for use later when it is actually desired to play the record; the latter feature is believed to be of great benefit to radio stations and the like.

Generally speaking, one aspect of this invention provides a record player in which a phonograph record disc is supported in a playing position on a turntable which is rotatably driven at a selected speed about an axis. The disc, in its playing position, is engageable with a stylus supported by a transducer cartridge which is held in a carriage. The cartridge carriage is movable along a guide which defines a line of carriage movement radially of the turntable above the turntable in response to tracking engagement of the stylus in the spiral groove of the disc. Such a record player is characterized in that it includes sensing means which comprise a follower member which is disposed adjacent the carriage and which is drivable along a path parallel to the line of carriage movement. The sensing means sense the relative positions of the carriage and the follower along the line and the path, respectively, and generate a signal indicative of such relative positions.

DESCRIPTION OF THE DRAWINGS

The above-mentioned and other features of this invention are more fully set forth in the following detailed description of the presently preferred embodiment of the record player and of alternative embodiments of certain aspects of the record player, which description is presented with reference to the accompanying drawings, wherein:

FIG. 6 is a perspective exploded view of the components of the transducer cartridge suspension mechanism;

FIG. 6A is a perspective view of the flexible strap arrangement used in the suspension shown in FIG. 6 to hold the cartridge in place;

DESCRIPTION OF THE ILLUSTRATED EMBODIMENTS

Figure 1:
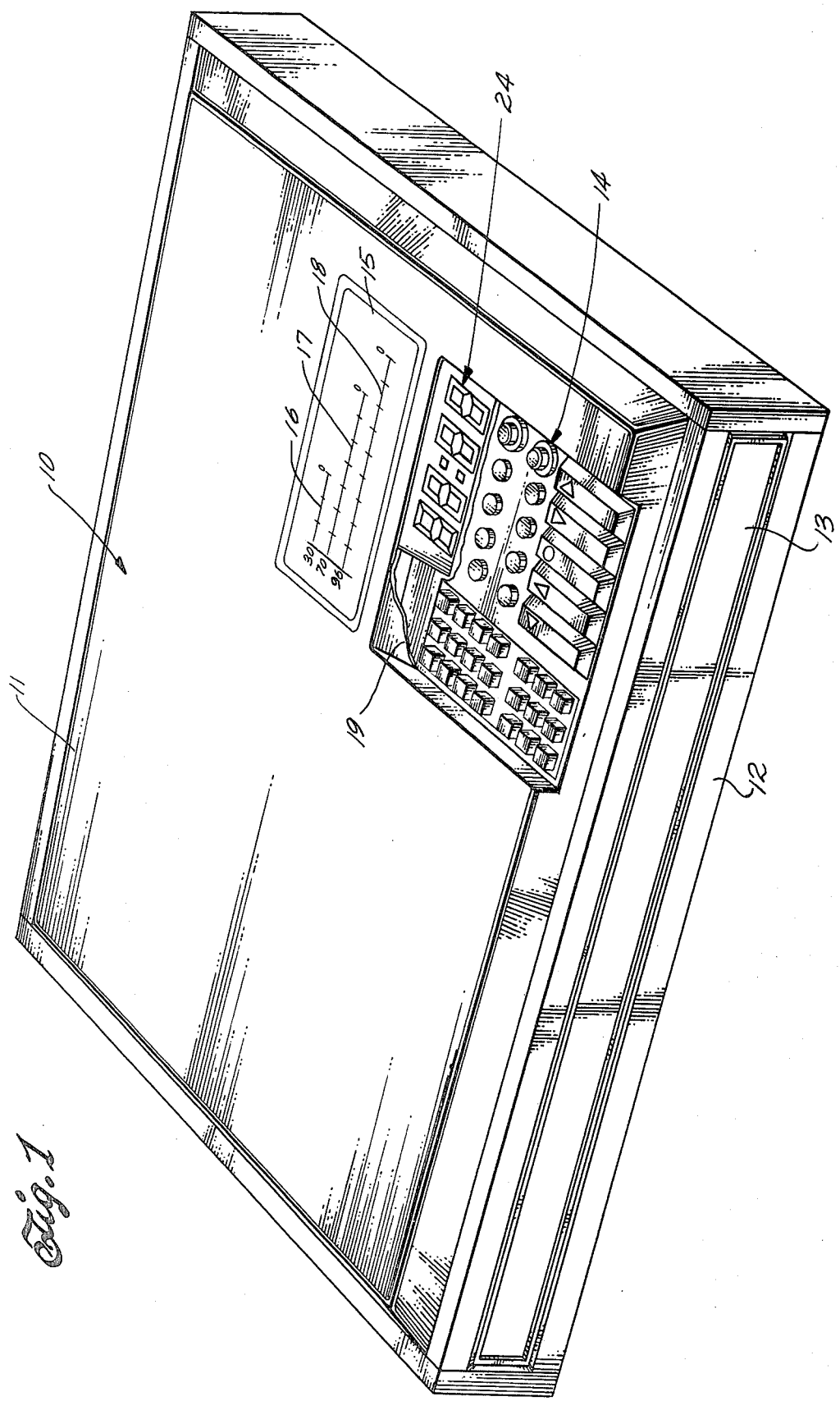
FIG. 1 is a perspective of the presently preferred record player according to this invention.

FIG. 1 is a perspective view of a programmable radial-tracking record player 10 which is the presently preferred record player according to this invention. Record player 10 has overall dimensions of $3\frac{1}{8}$ inches high by 17 inches wide by 13 inches deep. The top of the record player is defined by a cover 11 which is normally not openable by a user during operation of the record player. Instead, access to the interior of the record player, for the purpose of inserting a phonograph thereinto, is obtained via an openable door 13 which is incorporated in the front face 12 of the record player and which is shown in its closed position in FIG. 1. Preferably the cover 11 of record player 10 is defined of a smoked plastic material which appears to resemble obsidian or polished ebony at a distance, but which, from a close viewing position, enables an observer to see into the interior of the record player.

Figure 2:
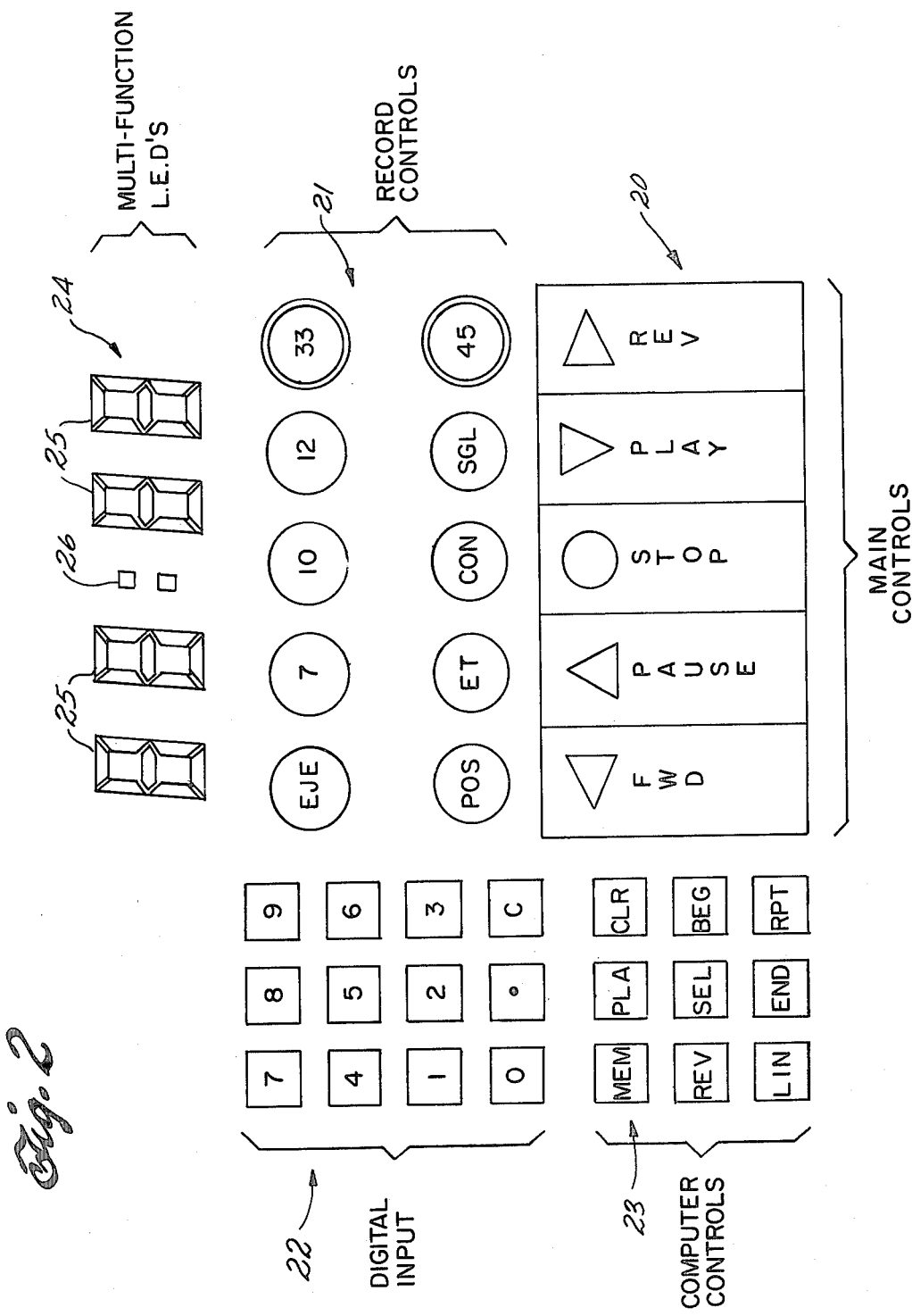
FIG. 2 is a chart showing the control and data display portion of the record player illustrated in FIG. 1.

A control and operating panel 14 is located in the lower right quadrant of the cover 11, and is shown in greater detail in FIG. 2. A transparent window 15 is provided through the cover immediately across the top of control panel 14, and is located generally above the path of movement of the stylus and its transducer cartridge radially of the axis of the turntable of the record player. The record player is constructed to play records of 7 inch, 10 inch or 12 inch diameter. Corresponding scales 16, 17 and 18 are carried by window 15 to enable the user to visually follow and determine the position of the stylus at any time across the width of the playing (audio information carrying) portion of the spiral groove of a record in the record player between the run-in and run-out portions of the groove. The relationship between the above-described externally visible features of record player 10 and its internal, normally inaccessible mechanisms will be apparent from the following description.

In the vicinity of control panel 14, the cover is recessed, as at 19, and suitable openings are provided through the bottom of the recess to enable projection into the recess of the pushbutton portions of the control command and data input switches which are all mounted on a common support in the record player below the recess. The display devices shown in FIG. 1 as part of display section 24 of control panel 14 are actually mounted below the cover, to be visible through the cover when illuminated, and this is shown by the content of FIG. 1.

As shown in FIG. 2, which is a chart showing the general organization and graphic detail of control panel 14, the control panel is functionally divided into a main control section 20, a record control section 21, a digital input section 22, a computer control section 23, and a visual display section 24. The latter section preferably is composed of four seven-segment light-emitting diode displays 25 arranged in pairs on either side of a two-element light-emitting diode 26 in which the elements are arranged in the form of a colon.

The individual controls involved in control panel 14, their functions, and the operations they control are described in articles published concerning record player 10 and appearing at (1) *Design News,* issue of Mar. 21, 1977 at pages 54 and 55; and (2) *Interface Age,* issue of May 1977 at pages 16–27. Other aspects of the record player are described in these articles and also in the article at pages 36 and 37, *Design News,* issue of Mar. 21, 1977. Reference is made to these articles for information about aspects of the record player other than the cartridge carriage position sensing system, cartridge traversing and positioning system, and cartridge lift system which are claimed and described in detail herein. Certain of these other aspects of the record player are illustrated in part in the accompanying drawings.

The principal structural elements of record player 10 are a bottom pan 60, preferably a casting, and a top frame 61, also preferably a casting. The top frame is supported on the bottom pan on suitable posts 62, one of which is shown in FIG. 13, to dispose the top frame generally horizontally parallel to the bottom pan, but closely adjacent to the underside of cover 11, thus providing a generally open space within the interior of the record player into which a record may be moved by operation of door 13. The cover 11 preferably is carried in a wooden frame 63 which defines the outer perimeter of the record player. The wooden frame is hinged to bottom pan 60 along the rear of the record player and is held in position on the bottom pan by suitable screws. Door 13 has a closed position in an opening 64 formed in the front face of the frame, as shown in FIG. 13.

Figure 3:
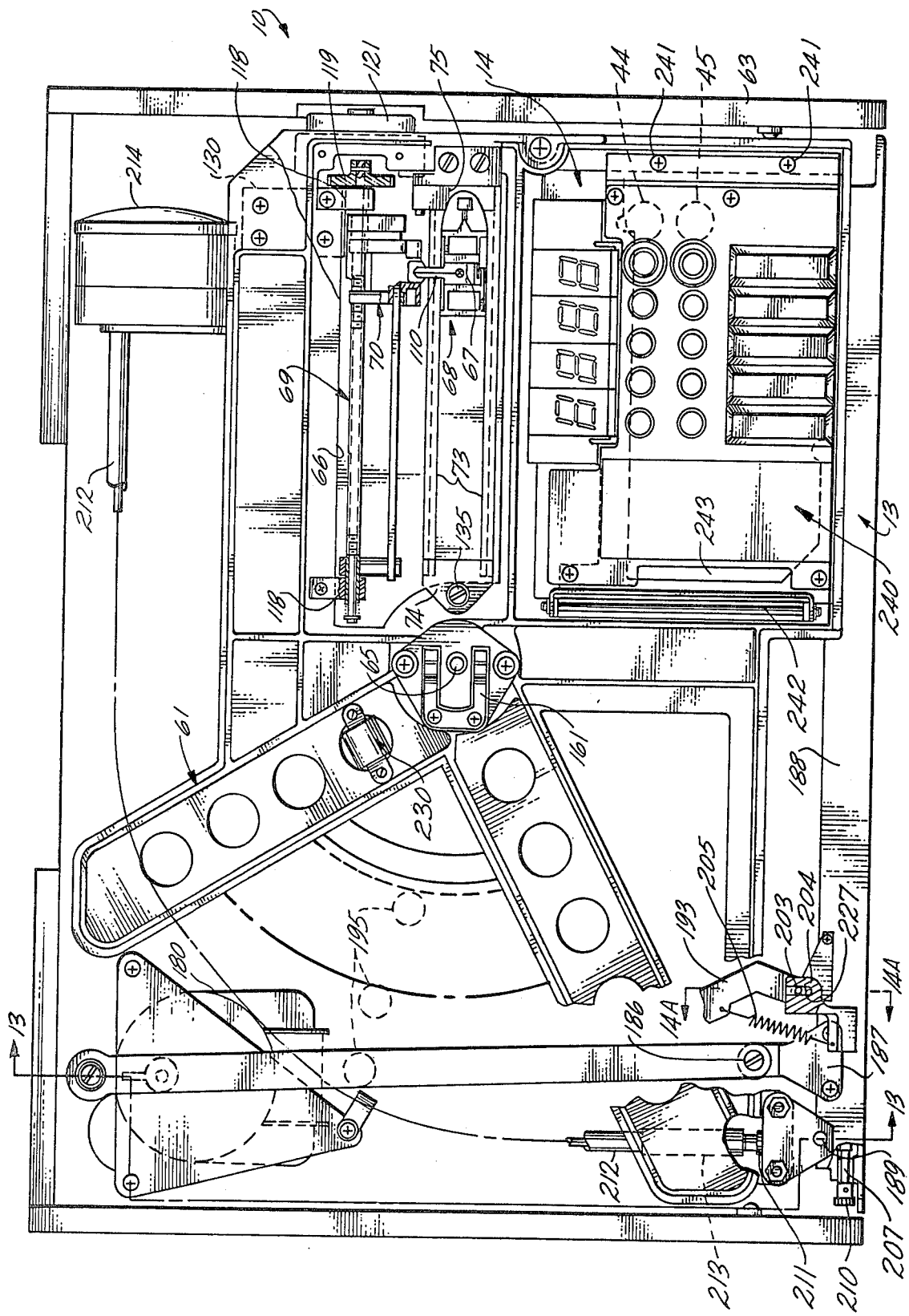
FIG. 3 is a top plan view of the record player of FIG. 1, with the cover thereof removed.

FIG. 3 is a simplified plan view, with some parts broken away and others shown in section, of the structure which is visible within the interior of record player 10 when cover 11 is opened. A major reference point of interest in the record player is the centerline, i.e., axis of rotation, 65 of a record 80 disposed in the record player. As viewed in FIG. 3, top frame 61 has an elongate opening 66 formed in it to the right of record axis 65 above control panel 14. The window 15 in cover 11 is located above this opening. The transducer cartridge and its stylus, it support suspension and carriage, the support tracks for the cartridge carriage, and the cartridge positioning and positioning sensing mechanisms are all located in top frame openings 66; see FIG. 3. The stylus transducer cartridge is indicated generally in FIG. 3 at 67, the cartridge suspension and carriage at 68, the cartridge positioning and position-sensing mechanism at 69, and the follower member of the positioning and position-sensing mechanism at 70.

The preferred transducer cartridge used in record player 10 is a Bang & Olufsen stereophonic phonograph transducer cartridge Type MMC-4000, which is modified in the manner described below. The cartridge is disposed in the record player so that the sensitive axis of its transducer mechanism is vertical, i.e., parallel to record axis 65. The Bang & Olufsen cartridge is modified in the manner in which the diamond stylus is coupled to the transducer movement. In this type of cartridge, as supplied by the manufacturer, the stylus is carried on the unsupported end of an elongate, straight, tubular cantilever beam which is connected to the moving elements of the transducer movement. The stylus is mounted on that side of the cantilever support which is disposed downwardly when the cartridge is mounted as intended by the manufacturer, i.e., in a generally horizontal manner, so that the stylus support cantilever is disposed at an angle of about 20° to the plane of rotation of the record with which the stylus is engaged; compare FIG. 10 of my prior U.S. Pat. No. 3,658,347. To adapt this cartridge, i.e., the Bang & Olufsen Type MMC-4000 cartridge, for use in record player 10, the stylus cantilever is shortened to about ¼ of its original length, and the stylus is bonded into the end of the shortened stylus support tube. When the cartridge is mounted vertically relative to the record, the stylus is disposed along the sensitive axis of the cartridge transducer movement, and the stylus support arm is loaded essentially only axially as it follows the contours of the record groove which bear the audio information recorded on the phonograph record disc. It will be understood, however, that the stylus is also continuously loaded by the outer sidewall of the spiral groove as the record is rotated past the stylus; it is this side-loading of the stylus which is relied upon to drive the cartridge radially of record axis 65.

As shown best in FIGS. 4-6C, the stylus suspension carriage 68 is disposed between and carried by a pair of support rails 73 which, in cross-section, have a configuration resembling a structural channel, each channel being disposed so that the flanges thereof extend toward the other channel. The inner and outer ends of the rails are mounted to inner and outer end plates 74 and 75 which, in turn, are connected to top frame 61. The stylus suspension carriage includes a pair of substantially identical carrier members 76, the principal portions of which are disposed on opposite sides of the cartridge 67 between rails 73. The opposing faces of the carrier members define preferably identical, parallel, convexly curved cylindrical surfaces 77 (see FIG. 6). The terms "cylinder" and "cylindrical" are used in their broad mathematical meanings to describe surfaces 77 of carrier members 76. That is, a cylinder, in the mathematical sense, is defined as the surface traced or generated by a straight line, the generatrix, moving in space at all times parallel to another straight line, the directrix. Preferably, the cylindrical surfaces 77 are circularly cylindrical. Also, in the carriage suspension shown in FIG. 6, for example, the arrangement is geometrically balanced by virtue of carrier member pivot axes 78 being spaced equidistantly from the respective cylindrical surfaces 77, with the result that surfaces 77 in the preferred arrangement have equal radii of curvature. It will be appreciated, however, that it is not necessary that the cylindrical surfaces be of circularly cylindrical configuration or that they be identical; a change in the effective length between one cylindrical surface and the associated pivot axis, relative to the corresponding length associated with the other carrier member, can be compensated, in terms of the result desired in the cartridge suspension mechanism, by an adjustment in the curvature of one cylindrical surface or the other. It is important, however, that the directrices of the two cylindrical surfaces be parallel to each other. Preferably, as in the illustrated embodiment shown in FIG. 6, the directrices of the cylindrical surfaces 77 coincide with pivot axes 78.

Figure 5:
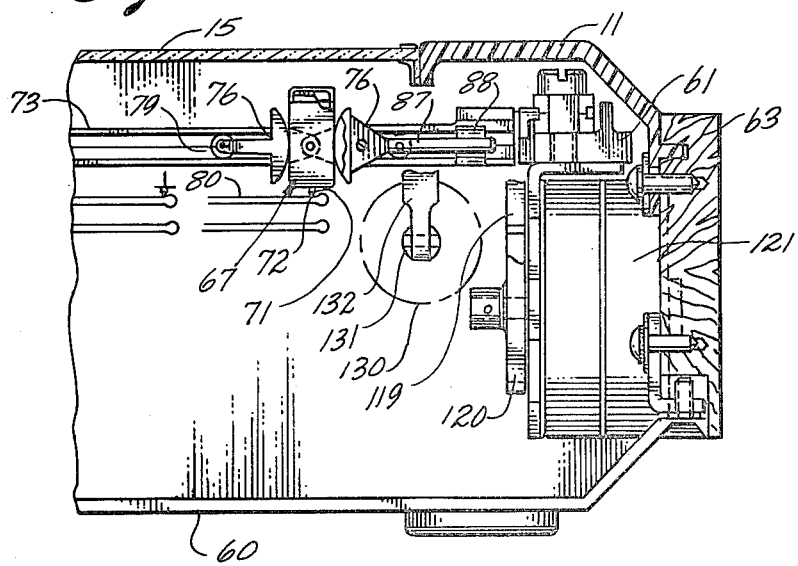
FIG. 5 is an elevation view, partially in section, of the cartridge suspension mechanism.

The carrier members 76 are mounted to support rails 73 for rotation of each carrier member relative to the rails about a respective one of pivot axes 78. In carriage suspension 68, this mounting is accomplished by roller wheels 79 which, as shown in FIG. 5, are engaged between the opposing surfaces of the flanges of the respective ones of rails 73. The mounting of the carrier members to the support rails is such that the pivot axes (a) are spaced from the respective cylindrical surface 77 in a direction away from the other carrier member 76, (b) are parallel to the respective cylindrical surface directrix (in the preferred embodiment, the pivot axes and directrices coincide), and (c) are parallel to the disc plane of rotation when the carrier member supports, i.e., support rails 73, are in operating position relative to a record in record player 10. Where the directrices and pivot axes of the respective carrier members do not coincide, the mounting of the carrier members to the support rails is also arranged to provide for movement of at least one of the pivot axes toward and away from the other pivot axis in a direction which is parallel to the disc plane of rotation when the carrier member support is in operating position relative to a record. It will be observed that, in suspension mechanism 68, both pivot axes 78 are movable together in a direction parallel to the plane of rotation of record 80 as shown, for example, in FIG. 5. The playing position of record 80, as shown in FIG. 5, is the upper position of the record; the lower position of the record corresponds to the position of the record on first introduction into the record player when the turntable is in its lowered position along its axis of rotation.

Figure 6B:
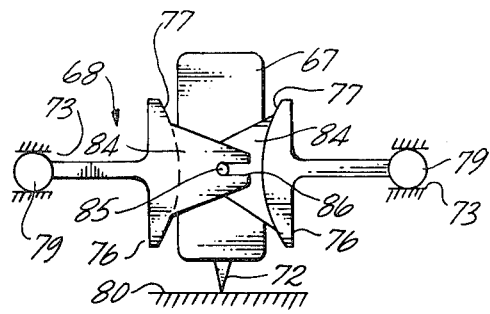
FIG. 6B is a schematic elevation view of the suspension mechanism in one state thereof.
Figure 6C:
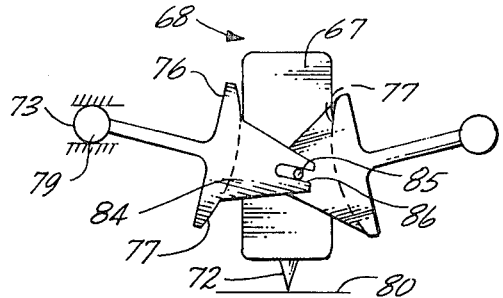
FIG. 6C is a view similar to the view of FIG. 6B showing the suspension mechanism in another state thereof.

Suspension mechanism 68 also includes a flexible strap arrangement 81 (see FIG. 6A) which is coupled between the carrier members 78 and cartridge 67 to (a) substantially encircle the cartridge when it is positioned between cylindrical surfaces 77, (b) for holding an encircled cartridge in substantially frictionless rolling contact with cylindrical surfaces 77, and (c) for constraining the encircled cartridge to move relative to the support, i.e., rails 73, in response to loads applied to the cartridge in a direction normal to the plane of rotation of record 80. Preferably, the strap arrangement 81 is fabricated of thin (0.001 inch) Mylar film and, when installed, has the configuration shown in FIG. 6A which shows the strap arrangement in its actual geometry in use. In FIG. 6, the strap arrangement 81 has been broken into two parts to better illustrate its geometry and relationship to both the cartridge and the carrier members. As seen in FIG. 6A, the strap passes twice through itself to define a figure resembling an "8" having three lobes; the two end lobes encircle the major portions of the carrier members which define surfaces 77, and the center lobe encircles the cartridge. The coupled position of the flexible strap arrangement to the carrier members is indicated in FIG. 6 by broken lines 82. A hole 83 is formed through the strap arrangement at an appropriate location in its central lobe to enable the stylus support arm to project from the cartridge per se through the strap arrangement toward record 80.

Suspension 68 also includes link means which are coupled between carrier members 76 for causing both carrier members to move in synchronism in opposite directions, i.e., one clockwise and the other counterclockwise, about their respective pivot axes 78 in response to loads applied to an encircled cartridge 70 in a direction normal to the plane of rotation of record 80. Usually such loads are applied to the cartridge by the localized contour of the record groove, but more significantly by warpage of the record. The linkage between the carrier members is defined in suspension 68 by a pair of fingers 84 which extend from opposed ends of each of cylindrical surfaces 77 toward the other carrier member, by a pin 85 which extends from one finger 84, and by a pin receiving slot 86 formed in the end of the other finger. Pin 85 is centered midway between cylindrical surfaces 77. A link arrangement, as described above and as shown in FIG. 6, may be provided at both ends of the carrier members, if desired.

A threaded shaft 87 extends from one of carrier members 76, at a location between that carrier member's roller wheels 79, in a direction which preferably causes the axis of shaft 87 to pass through the center of cylindrical surface 77 of that carrier member. A counterbalance mass 88 is threadably engaged on shaft 87. The position of counterbalance mass 88 on shaft 87 is adjustable to define the tracking force which is produced between the stylus 72 carried by cartridge 67 and record 80 during play of the record in record player 10. This tracking force can be adjusted to be essentially zero. That is, the position of mass 88 on shaft 87 is adjusted to compensate for the tendency of the carrier members, and the cartridge engaged between them, to rotate in a direction causing the cartridge to move toward the playing position of record 80.

From the foregoing description of cartridge suspension mechanism 68, it will be apparent that the coupling of the cartridge to carrier member 76 by flexible strap arrangement 81 provides an essentially frictionless and free floating suspension of cartridge 67 between support rails 73. Accordingly, the cartridge suspension has very high compliance to loads imposed on the cartridge along the line of the stylus support member 71. This means that the cartridge is virtually insensitive to loads imposed upon it by warpage in a record 80, and that the transducer movement of cartridge 67 produces electrical output signals which are accurately indicative, to an extent which has heretofore been impossible to achieve as a practical matter, of the audio information recorded in the groove of record 80. Because the carriage suspension is itself supported between rails 73 on roller wheels 79, the entire cartridge suspension is movable along a path radially of record 80; rails 73 are disposed parallel to and on opposite sides of a line radially of turntable axis 65. It is therefore apparent that cartridge 67, and stylus 72 carried thereby, are mounted in record player 10 to be sensitive to only those motions which are experienced by the cutting tool of the lathe used to cut the master disc from which record 80 is replicated. This suspension is of very high comliance in view of the low mass of the moving parts of the suspension, and in view of the friction-free or very low friction connections within the suspension itself and of the suspension to support rails 73.

Referring to FIGS. 3, 4, 5, 7 and 8, it was noted above that cartridge positioning and position sensing mechanism 69 includes a cartridge follower member 70. From the following description, it will be appreciated that this mechanism may be used in association with a cartridge suspension mechanism different from cartridge suspension mechanism 68 described above with reference to FIGS. 3–6C. In record player 10, the stylus followed member 70 cooperates with an arm 110 which is secured to the top of cartridge 67, and which extends across the top of that one of rails 73 which lies to the rear of record player 10. The arm extends along a line perpendicular to the path of movement of the cartridge radially of turntable axis 65. The upper surface of arm 110 carries a reference mark 111 (see FIG. 7) which is observable by a user through window 15, and which, in cooperation with an appropriate one of scales 16, 17 and 18, visually indicates the position of the stylus at any point during the course of playing a record. Reference mark 111 is vertically aligned with the position of stylus 72 in cartridge 67. The end of the arm 110 which lies remote from the cartridge defines a downwardly extending finger 112 which cooperates in a recess 113 formed in the forward extent of follower member 70.

Figure 4:
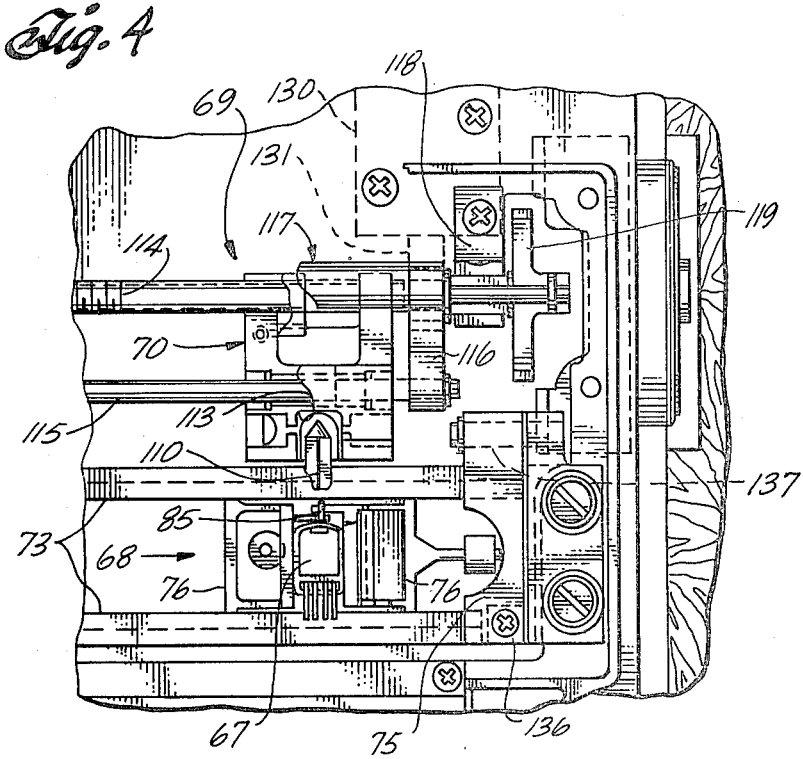
FIG. 4 is a fragmentary plan view, partially in section, of the cartridge suspension in its preferred form.

The follower member is disposed adjacent to the cartridge, as shown in FIGS. 3 and 4, for movement along a path which is parallel to the line of movement of cartridge 67 radially of turntable axis 65. The follower member is normally out of physical contact with the cartridge, but follows movement of the cartridge in the manner described below during playing engagement of stylus 72 with record 80. Sensing means are carried by the follower member for cooperation with arm 110 for sensing the position of the cartridge along its line of movement, and for generating a signal which is indicative of the relative positions between the cartridge and the follower member as the cartridge and the follower member move along their parallel paths. Further, drive means are coupled to the sensing means to be responsive to the signal generated by the sensing means. These drive means are also coupled to the follower member for driving the follower member to cause the signal to tend toward zero. Thus, the relative position between the cartridge and the follower member is continually monitored, a signal is generated indicative of the relative positions between these elements, and that signal is relied upon to cause the follower member to be driven parallel to the radial line of movement of the cartridge to cause the follower member to stay very closely in a predetermined alignment with the cartridge.

More specifically, a finely threaded leadscrew 114 is supported adjacent the rear edge of top frame opening 66 parallel to rails 73. The rear extent of follower member 70 is engaged with the leadscrew so that the follower member is driven in one direction or the other, dependent upon the direction of rotation of the leadscrew, along a path parallel to rails 73. The follower member is also supported forward of the leadscrew on a rod 115 which is parallel to the leadscrew and which is supported at its opposite ends in forwardly extending lugs 116 of bracket 117. The bracket is rotatably journalled about the leadscrew adjacent the opposite ends of the leadscrew. Rod 115 passes through the follower member to the rear of recess 113. The normal position of bracket 117 places leadscrew 114 and rod 115 substantially in a common plane parallel to the plane of rotation of record 80. At its extreme right end, as viewed in FIGS. 4 and 5, a gear 119 is secured to the leadscrew shaft to the right of a support arm 118 in which the leadscrew is rotatably journalled. Gear 119 cooperates with a gear 120 which is fixed to the output shaft of a stepping motor 121 which is mounted to top frame 61 below gear 119. The stepping motor is a reversible mechanism. It is apparent, thus, that the follower member 70 is driven in one direction or the other parallel to rails 73 dependent upon the direction of rotation of the stepping motor. The output signal derived from the sensing means in the follower member is used to control the amount and direction of operation of the stepping motor, thereby to cause the follower member to be driven to closely follow the motion of the cartridge within predetermined limits.

It is desirable that the cartridge be able to move radially of the record solely in response to the "feed" of the spiral groove of the record 80 past stylus 72 without constraint in any respect (save for the small amount of friction associated with rollers 79) during play of record 80. Accordingly, the cooperation of the sensing means within the follower member with the cartridge is a cooperation which is not dependent upon physical contact between the cartridge and the follower member.

In a record player 10, the sensing means within the follower member is an optical sensor which includes a collimated light source 122 mounted in the rear face of recess 113 to direct a beam of collimated light perpendicular to the path of movement of the follower member. The optical sensing means also includes a beam splitter which is defined by a pair of mirrored surfaces 123 defined by the rearmost extent of finger 112. Mirrored surfaces 123 are disposed at right angles to each other, and a bisecter of the included angle between these surfaces is perpendicular to the path of movement of the cartridge along rails 73 and passes through the axis of the stylus support 71. The sensing means further includes a pair of photocells 124 which communicate to recess 113 through the sidewalls thereof. The photocells are coaxially aligned along a line which passes through finger 110 at a point slightly toward the cartridge from the point of intersection of mirrored surface 123; see FIG. 7.

Figure 7:
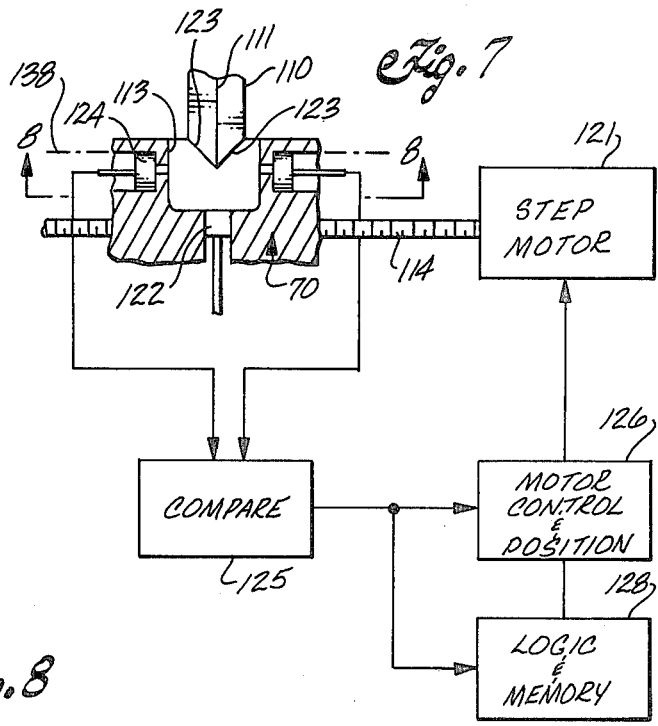
FIG. 7 is a simplified fragmentary cross-sectional elevation view and block diagram illustrating the cooperation between the cartridge and the follower member of the cartridge position sensing mechanism.

The predetermined positional relationship between the cartridge and the follower member, which is sought to be maintained by operation of stepping motor 121, is a relationship in which the line of intersection between mirrored surfaces 123 of the beam splitter is directly aligned with collimated light source 122. In this situation, photocells 124 receive equal amounts of light, and the difference between the outputs of the photocells, as determined by a comparison circuit 125, is a control signal having zero value. It will be appreciated that, as record 80 is played, the cartridge is advanced along its line of movement in response to the feed of the record spiral groove past the stylus, and that the cartridge will tend to lead the position of the follower member from time-to-time in a direction toward turntable axis 65. As this occurs, the mirrored surface 123 closest to turntable axis 65 will receive less light from the light source than the other mirrored surface, thereby producing a difference between the outputs of the photocells and producing a signal from comparison circuit 125, which has a positive or "forward" command meaning. This signal is interpreted by a motor control and positioning circuit 126 coupled between the stepping motor and the comparison circuit, as indicated in FIG. 7. The stepping motor is therefore instructed, by the motor control and position circuit itself to operate the stepping motor sufficiently to advance the follower member to restore the predetermined positional relationship between the follower member and the cartridge.

The width of recess 113, in a direction parallel to the path of movement of the follower member, is sufficiently greater than the width of cartridge finger 112 to provide a clearance between the opposite sides of the finger and the sidewalls of the recess when the desired positional relationship between the cartridge and the follower member exists. This clearance corresponds to plural steps of stepping motor 121. In record player 10, the pitch of the leadscrew 114, the gear ratio defined by the gears 119 and 120, and the rotation of gear 120 for each step of motor 121 all cause the follower member to be moved approximately 0.02 millimeter for each step of the stepping motor.

The logic and memory aspects of the control system for record player 10 are represented generally in FIG. 7 at 128. This aspect of the control system includes a counter in which is accumulated a count of the pulses required to operate the stepping motor sufficiently to drive the follower member from any given position along its path of movement back to a "base" position thereof which is defined at the limit of its travel along rod 115 adjacent to turntable axis 65. On operation of the position (POS) control button on control panel 14, the number accumulated in this counter, translated into millimeters from the "home" position of the follower member, is displayed in the visual display section 24 of control panel 14. The width of the audio information-carrying band on a 12 inch record is 96 mm. The counter associated with the "base" position of the stylus has a capacity sufficient to accumulate a count equal to the member of pulses necessary to operate motor 121 to drive the follower member 70 a distance of 96 mm. It is this count which is actually assigned to memory when the computer in the record player is programmed to determine the manner in which a given record is to be played. The complement of this count is displayed, assuming a 12 inch record has been selected, when POS button 41 is depressed. The number displayed in display section 24 of control panel 14 on operation of the POS button is the distance in millimeters of the stylus from its "home" position. The "home" position is defined at the run-in portion of a record of interest, i.e., at the outer margin of a record. The width of the information band of a 10 inch record is 70 mm, and is 30 mm for a 7 inch record. Thus, when a 7 inch or a 10 inch record, respectively, has been selected, counts corresponding to the figures "66.00" and "26.00" are automatically subtracted from the count in the counter which cumulates the count complementary to the count in the counter associated with the "base" position of the stylus; this adusted count is displayed in display section 24 on operation of POS button 41 when a 7 inch or 10 inch record has been selected. Thus, the record player operates internally in terms of the "base" position of stylus 72 close to axis 65 (which position is common to all sizes of records), but communicates via display section 24 to a user of the record player in terms of the outer edge of whatever record is of interest to the user because people usually think in terms of the beginning of a record.

Mechanism 69 is also arranged for positioning cartridge 67 in any desired position along its path of movement radially of turntable 65, either preparatory to the playing of a record in the conventional manner, preparatory to playing of a selected passage of the record lying at some selected point between the run-in and run-out portions of the record groove, or for causing a selected portion within a record to be repeated one or more times. Accordingly, the cartridge positioning and position sensing mechanism 69 is arranged to lift the cartridge in its suspension to cause stylus 72 to be moved out of contact with record 80, and then to move the cartridge in either direction along its path of movement relative to the record.

The cartridge lift mechanism includes a solenoid 130 having a reciprocable armature 131 which is connected to a depending lug 132 of bracket 117, which in turn supports rod 115 along which follower member 70 is movable in response to rotation of leadscrew 114 (see FIGS. 4 and 5). When the solenoid is operated, its armature 131 is extended to cause bracket 117 to be rotated about the leadscrew in a direction which causes shaft 115 to revolve upwardly out of its normal position. Such movement of the rod moves the follower member 70 so that the bottom of recess 113 engages the lower end of cartridge arm finger 112, and lifts the cartridge in its suspension 68. In this manner, the stylus 72 is lifted out of contact with record 80 while the record is in its playing position within the record player.

Figure 8:
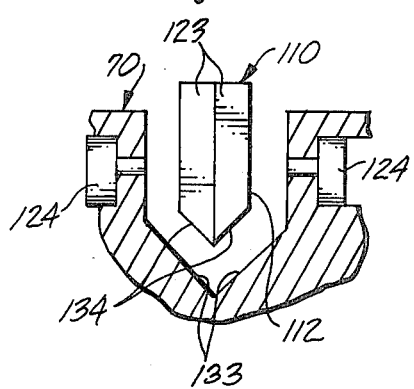
FIG. 8 is a view taken along line 8—8 in FIG. 7.

As shown best in FIG. 8, the bottom of follower member recess 113 is defined by two sloping surfaces 133 which intersect along a line equidistantly between the sidewalls of the recess and perpendicular to the follower member path of movement. The lower end of finger 112 defines a pair of sloping surfaces 134, the line of intersection between these surfaces being parallel to the line of intersection of surfaces 133 and intersecting the line of intersection of beam splitter mirrored surfaces 123. Each of surfaces 134 is parallel to a respective one of recess bottom surfaces 133. Therefore, as the forward portion of follower member 70 is raised in response to operation of solenoid 130, surfaces 133 and 134 engage each other and cause the cartridge to assume its desired predetermined positional relationship relative to the follower member. In this situation, the position of the follower member along its path of movement, as determined by the count of the number of stepper motor pulses relative to the "base" position of the follower at that instant, corresponds precisely to the position of the cartridge.

Stepping motor 121 has two operating modes. In one operating mode, it is operated by discrete pulses which are supplied to it in response to the difference signal produced by comparison circuit 125 during play of a record to cause the follower member 70 to tend to maintain its predetermined positional relationship relative to the cartridge as the cartridge moves in response to engagement of stylus 72 with the record groove. The second operational mode of the stepping motor is a slew mode in which the motor is operated rapidly to drive the follower member for the purpose of disposing the cartridge in a predetermined position, as described above. Operation of the stepping motor in its slew mode corresponds to the high speed traversing movement of the cartridge. Solenoid 130 is functionally interlocked with the stepping motor so that the stepping motor cannot be operated in its slew mode unless and until the solenoid is operated to raise stylus 72 out of engagement with record 80. This interlock function is performed by a read-only memory which is a component of the overall record player control system illustrated in the block diagram of FIG. 16. Traversing of the cartridge to a predetermined position is accomplished by inserting into an appropriate "desired position" counter a number corresponding to the desired position of the cartridge, and then operating the stepping motor in its slew mode until the number in the complementary counter mention above equals the number in the "desired position" counter. When the stylus has been moved by operation of the stepping motor in its slew mode to the desired position, energization of solenoid 130 is discontinued to lower the stylus into contact with the record.

It will be apparent from the foregoing description that the stylus can be prepositioned along its path of movement radially of the turntable axis to within 0.02 millimeter accuracy. The width of the spiral groove in record 80 is greater than 0.02 millimeter. Thus, the stylus can be prepositioned at any desired location relative to the record groove subject only to the ambiguity associated with the angular position of the record relative to the stylus.

The presently preferred stepping motor 121 is a Type SM40-3602 stepping motor manufactured by Fuji Electrochemical Co., Ltd., Tokyo, Japan. It is preferred that the motor control and position circuit 126 (see FIG. 7) be defined by a Fuji Electrochemical driver module, Type SD-01. A Fuji Electrochemical Type SM40-3602 stepper motor has a single step angle of 10°, and has maximum pull-in and pull-out pulse rates of 340 and 510 pulses per second, respectively.

Cartridge 67 is made accessible within record player 10 for various purposes, including changing stylus 72 as it becomes worn. To provide such access to the cartridge and the stylus, the cartridge support rail assembly is mounted to be rotated to provide access to the stylus, for example, but in such a manner as not to interfere with the cooperation between the cartridge and the cartridge positioning and position sensing mechanism. Accordingly, rail inner end plate 73 is connected to the top frame 61 of the record player by a screw 135 (see FIG. 3) and the outer end plate 75 is connected to the frame by a screw 136 (see FIG. 4) and by a hinge pin 137. Hinge pin 137 is aligned parallel to rails 73 between the rails and follower member support rod 15. When screws 135 and 136 are removed, the entire support structure for the cartridge suspension, i.e., the rails 73 and their connecting end plates, with the cartridge and its suspension, may be moved into a more accessible position by rotation of outer end plate 75 about hinge pin 137 has an axis 138 which, as shown in FIG. 7, passes through the center of beam splitter mirrored surfaces 123 slightly forwardly of the axis along which photoceslls 124 are aligned. Thus, the cartridge can be moved for service or access out of its normal operating position in the record player without damaging the signal generating mechanism associated with the follower member 70.

It will be appreciated that the foregoing description has been presented with reference to a presently preferred embodiment of this invention and to certain selected alternative embodiments of certain aspects of this invention. The preceding descriptions have been set forth by way of example, not as an exhaustive treatise or catalog of all forms which this invention may take. Accordingly, workers skilled in the art or arts to which this invention pertains will readily recognize that alterations, variations or modifications on the structures, arrangements and systems described above may be made without departing from the scope of this invention, and that the following claims are not to be interpreted as pertaining only to the specific arrangements, structures and procedures described above.

What is claimed is:

1. A record player in which a phonograph record disc is supported in a playing position on a turntable rotatably drivable at a selected speed about an axis, the disc in its playing position being engageable with a stylus supported by a transducer cartridge held in a carriage which is movable in a carriage guide defining a line of carriage movement radially of the turntable above the turntable in response to tracking engagement of the stylus in the spiral groove of the disc, and characterized in that the cartridge is mounted in the carriage for movement in the carriage normal to the turntable, and the record player includes lift means cooperable with the cartridge and selectively operable at any location of the carriage along said line for lifting the cartridge in the carriage away from the turntable, thereby to move the stylus out of engagement with a record on the turntable, the lift means including a first element connected to the cartridge for movement with the carriage along said line and with the cartridge in the carriage, a second element selectively engageable with the first element for moving the cartridge in the carriage, means mounting the second element for movement along a path parallel to said line in cooperative juxtaposition to the first element and for movement into engagement selectively with the first element, and selectively operable means for moving the second element into engagement with the first element at any position of the second element along said path.

2. A record player according to claim 1 including selectively operable traverse means cooperatively associated with the carriage for moving the carriage to any desired position along said line.

3. A record player according to claim 2 wherein the lift means and the traverse means are cooperatively interrelated for operation of the traverse means when a record is supported on the turntable only when the lift means is operated.

4. A record player according to claim 1 wherein the carriage guide is disposed proximately parallel to the line of movement of the carriage radially of the turntable.

5. A record player according to claim 4 wherein the carriage guide is disposed substantially symmetrically about said line of movement.

6. A record player in which a phonograph record disc is supported in a playing position on a turntable rotatably drivable at a selected speed about an axis, the disc in its playing position being engageable with a stylus supported by a transducer cartridge held in a carriage which is movable in a carriage guide defining a line of carriage movement radially of the turntable above the turntable in response to tracking engagement of the stylus in the spiral groove of the disc, and characterized in that the record player includes sensing means comprising a follower member disposed adjacent the carriage, mounting means for mounting the follower member for movement along a path parallel to said line for following the movement of the carriage along said line during record playing engagement of the stylus with a record, follower member drive means operable for driving the follower member along said path, the sensing means being operable for sensing the relative positions along said line and said path of the carriage and the follower member and for generating a signal indicative thereof.

7. A record player according to claim 6 further comprising lift means which includes the follower member, means for mounting the follower member for movement about said path between a normal position in which the follower member is disposed out of effective contact with the cartridge and an actuated lift position in which the follower member effectively engages the cartridge, the follower member drive means being operable for driving the follower member along said path in either of its normal and actuated lift positions, the follower member in moving from its normal to its actuated lift position effectively engaging the cartridge and moving the cartridge away from the playing position of a record disc on the turntable thereby to lift the stylus out of contact with a record in such playing position, and selectively operable means associated with the follower member operable at any location of the follower member along its path of movement for moving the follower member about the path between its normal and its actuated lift positions.

8. A record player according to claim 7 wherein the cartridge and the carriage are cooperatively related for movement of the cartridge in the carriage away from and toward the record disc playing position in response to movement of the follower member about its path of movement into and out of its actuated lift position.

9. A record player according to claim 7 wherein the lift means includes a finger carried by the cartridge and extending therefrom toward the follower member, the finger and the follower member being out of contact when the follower member is in its normal position, the finger being engaged by the follower member in the course of movement of the follower member from its normal to its actuated lift position.

10. A record player according to claim 9 wherein the finger is also a component of the sensing means.

11. A record player according to claim 9 wherein the finger and the follower member are cooperatively configured for disposing the cartridge in a predetermined position along said line relative to the follower member.

12. A record player according to claim 7 including a leadscrew engaged with the follower member and rotatable for driving the follower member along said path, and wherein the selectively operable means mentioned in claim 7 is operable for moving the follower member angularly about the leadscrew.

13. A record player according to claim 6 wherein the sensing means and the follower member normally are out of physical contact with the carriage.

14. A record player according to claim 13 wherein the follower member drive means is coupled to the sensing means and is responsive to said signal for driving the follower member to cause the signal to tend to zero.

15. A record player according to claim 14 wherein the drive means includes a reversible motor coupled to the follower member for driving the follower member along the path, and motor control means responsive to the signal for operating the motor to cause the signal to tend to zero.

16. A record player according to claim 15 wherein the motor is a stepping motor.

17. A record player according to claim 16 wherein the carriage has a home position along said line, and counter means associated with the stepping motor control means for accumulating a number indicative of the position of the carriage relative to the home position thereof.

18. A record player according to claim 17 including display means and control means therefor operable for displaying the number accumulated at any time in the counter means in terms of a selected unit of linear measure.

19. A record player according to claim 17 wherein the carriage home position is defined to correspond to the run-in portion of the groove of a phonograph record.

20. A record player according to claim 17 including positioning means operable for moving the carriage to any predetermined position thereof along said line relative to the home position thereof.

21. A record player according to claim 20 wherein the positioning means includes the stepping motor and the control means therefor, a second counter means into which may be entered a number descriptive of a desired position of the carriage along said line, and further control means for operating the stepping motor to cause the number in the first counter means to coincide with a number in the second counter means.

22. A record player according to claim 21 wherein the positioning means includes selectively operable lift means cooperatively associated with the cartridge for lifting the cartridge away from the turntable.

23. A record player according to claim 22 wherein the lift means and the further control means are cooperatively related to enable operation of the further control means only when the lift means is operated.

24. A record player according to claim 22 wherein the lift means includes means operable for moving the follower member effectively into physical contact with the cartridge and for establishing a predetermined positional relation between the carriage and the follower member.

25. A record player according to claim 24 wherein said predetermined positional relation is that which corresponds to a zero value of said signal.

26. A record player according to claim 6 wherein the sensing means includes optical means.

27. A record player according to claim 26 wherein the optical means includes a collimated light source mounted to the follower member, a mirrored beam splitter effectively carried by the carriage and toward which the center of which the light source is directed when the carriage is in a certain position relative to the follower member, and a pair of photocells mounted to the follower member for illumination by light from the source reflected by the beam splitter.

28. A record player according to claim 27 wherein the photocells are disposed for equal illumination when the carriage is in said certain position relative to the follower member, the signal then having a zero value.

* * * * *